US012619492B1

(12) United States Patent
Fitzpatrick

(10) Patent No.: US 12,619,492 B1
(45) Date of Patent: May 5, 2026

(54) BURST ERROR CORRECTION FOR REED-SOLOMON CODES

(71) Applicant: ScaleFlux, Inc., Milpitas, CA (US)

(72) Inventor: Kelly Fitzpatrick, Laguna Niguel, CA (US)

(73) Assignee: SCALEFLUX, INC., Milpitas, CA (US)

( * ) Notice: Subject to any disclaimer, the term of this patent is extended or adjusted under 35 U.S.C. 154(b) by 23 days.

(21) Appl. No.: 18/768,649

(22) Filed: Jul. 10, 2024

Related U.S. Application Data

(60) Provisional application No. 63/512,967, filed on Jul. 11, 2023.

(51) Int. Cl.
G06F 11/10 (2006.01)

(52) U.S. Cl.
CPC .................................. G06F 11/1044 (2013.01)

(58) Field of Classification Search
CPC .................................................... G06F 11/1044
See application file for complete search history.

(56) References Cited

U.S. PATENT DOCUMENTS

| | | | | |
|---|---|---|---|---|
| 6,654,926 B1 * | 11/2003 | Raphaeli | ............... | H03M 13/45 |
| | | | | 714/780 |
| 7,370,258 B2 | 5/2008 | Iancu et al. | | |
| 7,418,649 B2 | 8/2008 | Li | | |
| 10,164,660 B1 | 12/2018 | Finn et al. | | |

OTHER PUBLICATIONS

Guruswami, Venkatesan et al.; "Improved Decoding of Reed-Solomon and Algebraic-Geometry Codes"; Laboratory for Computer Science; MIT; May 11, 1999; pp. 26.

Guruswami, Venkatesan; "List Decoding of Error-Correcting Codes"; Submitted to the Department of Electrical Engineering and Computer Science; Copyright Massachusetts Institute of Technology; 2001; pp. 316.

Odenwalder, Joseph P.; Error Control Coding Handbook (Final Report); Jul. 15, 1976; pp. 235.

Parvaresh, Farzad et al.: "Correcting Errors Beyond the Guruswami-Sudan Radius in Polynomial Time"; IEEE Xplore; Foundations of Computer Science 2005; 46th Annual IEEE; Nov. 2005; pp. 10.

* cited by examiner

*Primary Examiner* — Thien Nguyen
(74) *Attorney, Agent, or Firm* — Hoffman Warnick LLC

(57) ABSTRACT

A system and method for processing errors in a self-managed DRAM module. A method includes receiving a block of code symbols comprising s code segments; loading the code symbols into a bank of list-decoding modules, wherein each module is configured to correct errors in a specific combination of code-segments from the block; for each list-decoder module, erase code symbols and calculate replacement code symbols to form a valid codeword; for each valid codeword, determine a codeword metric based on a number of corrections between the replacement code symbols and the erased received symbols; identify a first and a second valid codeword from the set of unique codewords generated by a bank of list-decoder modules having a minimum codeword metric and a second minimum codeword metric, respectively; and correct the first valid codeword if, based on the minimum and second minimum codeword metric, no decoding error is detected.

17 Claims, 5 Drawing Sheets

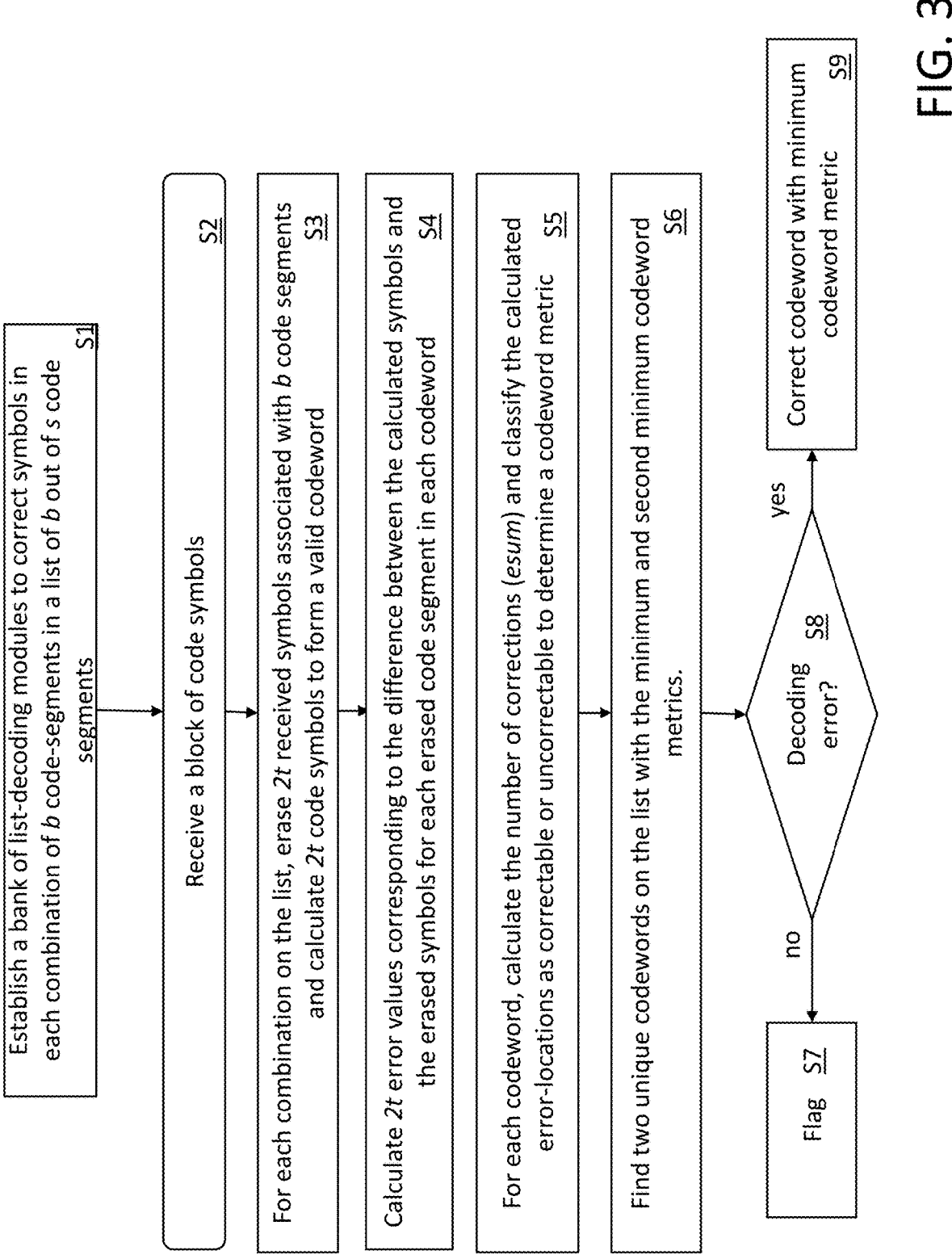

Establish a bank of list-decoding modules to correct symbols in each combination of *b* code-segments in a list of *b* out of *s* code segments    S1

Receive a block of code symbols    S2

For each combination on the list, erase 2*t* received symbols associated with *b* code segments and calculate 2*t* code symbols to form a valid codeword    S3

Calculate 2*t* error values corresponding to the difference between the calculated symbols and the erased symbols for each erased code segment in each codeword    S4

For each codeword, calculate the number of corrections (*esum*) and classify the calculated error-locations as correctable or uncorrectable to determine a codeword metric    S5

Find two unique codewords on the list with the minimum and second minimum codeword metrics.    S6

Decoding error?    S8 no → Flag    S7 yes → Correct codeword with minimum codeword metric    S9

FIG. 3

BURST ERROR CORRECTION FOR REED-SOLOMON CODES

PRIORITY CLAIM

This application claims priority to copending provisional application, 63/512,967, filed on Jul. 11, 2023, entitled BURST ERROR CORRECTION FOR REED-SOLOMON CODES, which is hereby incorporated by reference.

TECHNICAL FIELD

The present invention relates to the field of burst-error correction in latency-sensitive multi-device memory and storage systems, specifically methods of list decoding of Reed-Solomon codes in DDR (double data rate) DRAM (dynamic random-access memory) channels.

BACKGROUND OF THE INVENTION

In conventional DRAM practice, each CPU (central processing unit) connects to its exclusively owned/controlled DRAM modules, typically in the form of DIMM (dual in-line memory module), through dedicated DDR channels. More recently, the computing industry has developed open standards, in particular CXL (Compute Express Link), that allow CPU-memory connections over high-speed PCIe links. In this context, much of DRAM control/management functionalities are migrated from CPUs into a CXL/DRAM controller, leading to self-managed DRAM modules in contrast to the conventional CPU-managed DRAM modules.

DRAM memory typically consists of a set of DDR devices for data and parity that are jointly accessed by a high-speed memory channel interface. Reed-Solomon (RS) error-correction codes (ECC) are typically used to generate the parity, since RS codes are well-known for their burst error-correction capabilities. Correcting one ECC symbol corrects up to m-bit errors in a RS code defined over Galois Field $GF(2^m)$ with m-bit wide symbols. Due to super low-latency requirements, error correction for direct-attached DRAM memory has been limited to decoding algorithms completed in one clock cycle.

SUMMARY

The present invention relates to low-latency ECC decoding algorithms that can be completed in a few clock cycles using highly parallel code-specific hardware within a CXL/DRAM controller. Present embodiments harness lesser known burst error-correction capabilities through list decoding to correct a small number of burst-errors with a large number of symbol errors.

In one aspect, a method is provided for correcting errors in a self-managed DRAM device, comprising: receive a block of code symbols comprising s code segments each with T symbols; load the block of code symbols into a bank of $$\binom{s}{b}$$

listdecoder modules, wherein b is a number of correctable code segments, and wherein each list-decoder module is configured to correct 2t symbols associated with a combination of b code-segments from the block of received code symbols; for each list-decoder module, erase code symbols associated with b code segments and calculate replacement code symbols to form a valid codeword; for each valid codeword, determine a codeword metric based on a number of corrections between the replacement code symbols and the erased received symbols; identify a first and a second valid codeword on the list having a minimum codeword metric and a second minimum codeword metric, respectively; and correct the first valid codeword if, based on the minimum and second minimum codeword metric, no decoding error is detected.

A further aspect comprises a self-managed DRAM device, comprising: a plurality of DRAM modules arranged in channels; and a controller chip, the controller chip configured to correcting errors in the plurality of DRAM modules according to a process that includes: receiving a block of code symbols comprising s code segments each with T symbols; loading the block of code symbols into a bank of $$\binom{s}{b}$$

list-decoder modules, wherein b is a number of correctable code segments, and wherein each list-decoder module is configured to correct 2t symbols associated with a combination of b code-segments from the block of received code symbols, where t is a number of symbols in each DRAM device in a channel; for each list-decoder module, erasing code symbols associated with b code segments and calculate replacement code symbols to form a valid codeword; for each valid codeword, determining a codeword metric based on a number of corrections between the replacement code symbols and the erased received symbols; identifying a first and a second valid codeword on the list having a minimum codeword metric and a second minimum codeword metric, respectively; and correcting the first valid codeword if, based on the minimum and second minimum codeword metric, no decoding error is detected.

BRIEF DESCRIPTION OF THE DRAWINGS

The numerous advantages of the present invention may be better understood by those skilled in the art by reference to the accompanying figures in which:

FIG. 3 illustrates an RS List Decoding Algorithm Flow Chart flow diagram of an ECC decoding scheme according to aspects of the disclosure.

DETAILED DESCRIPTION

Figure 1:
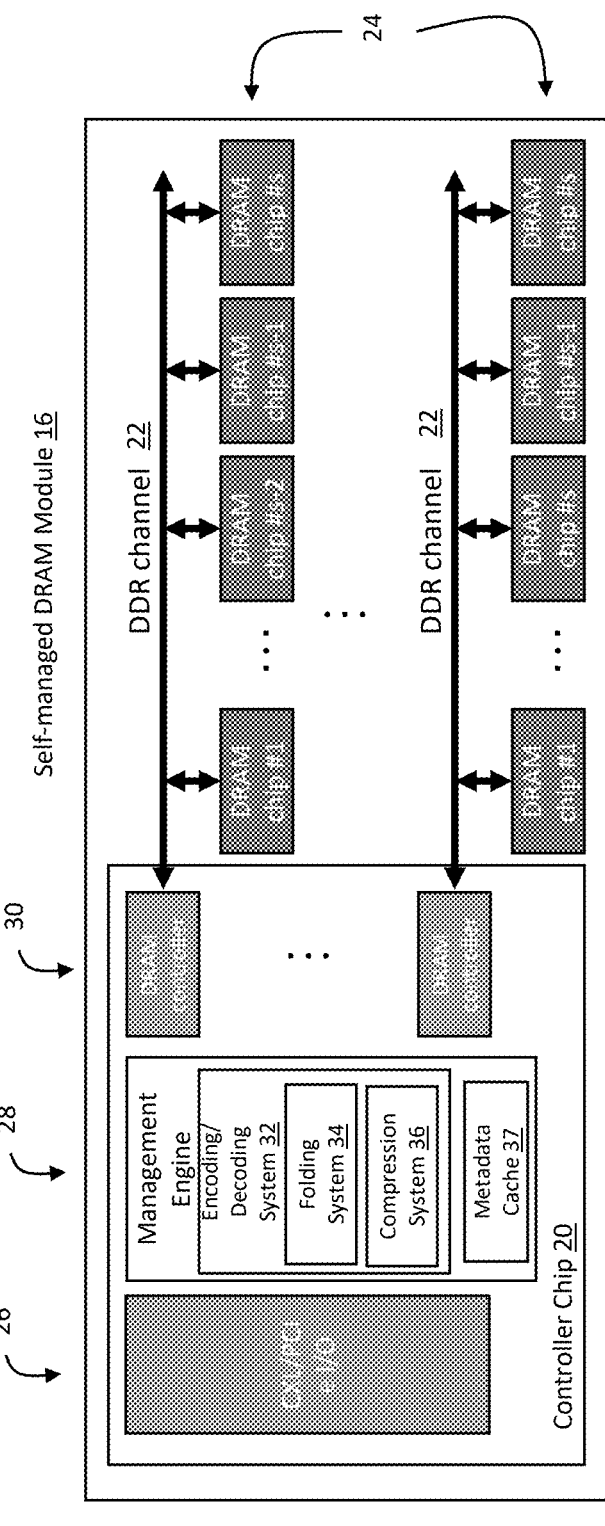
FIG. 1 illustrates the architecture of a self-managed DRAM module using a CXL/PCIe channel.

As noted, self-managed DRAM modules stripe data across multiple devices and use error-correction coding (ECC) to provide immunity to random errors and to the failure of one or more devices. Due to super low-latency requirements, error correction for direct-attached DRAM memory has been limited to decoding algorithms completed in one clock cycle. However, with the advent of PCIe-attached DRAM enabled by the CXL (Compute Express Link) protocol, there is a modest relaxation of the strict latency requirements.

Generally, multi-device channels have burst-errors that are device-limited and errors in different devices are considered independent burst-error events. A systematic error-correction code (ECC) is used to protect uncoded data stored in data devices The present embodiments provide a self-managed DRAM module capable of correcting all the symbols in a failed device and still have correction capability left-over to correct or at least detect a random error-event in a second device.

A particular challenge when attempting to increase error correcting capabilities is that a mis-corrected cache line loaded into the CPU execution path can cause problematic unpredictable behavior. Mis-corrections can be avoided by flagging a decoding error that notifies the CPU that the cache line was compromised. Some bit-errors are not repeatable; therefore, rereading a memory location may sufficiently change the random error distribution making a previously uncorrectable codeword correctable the second time through. The penalty of a flagged decoding error is often just the latency involved with rereading. Avoiding silent mis-correction in a multi-device memory system is likewise addressed herein.

Recent improvements that doubled throughput and capacity for DDR5 have eroded the error margin compared with the preceding generation of DDR4 memory, thereby necessitating the use of single-bit error correction inside each DDR5 device. The internal single-bit error-correction improves the error-event rate making it comparable to the previous DDR4 generation. However, there are more bit errors per error-event. Bit errors at the output of a DDR device tend to cluster along pin-lines. A DDR4 device receives 8-bits in a pin-line transferred 1-bit per pin per beat over 8-beats. The number of beats per transfer doubled, so that a DDR5 device receives 16-bits in a pin-line transferred 1-bit per pin per beat over 16-beats.

For DDR5, 1-bit errors are corrected internally so the errors at the output are multi-bit errors. Some multi-bit errors are detected and passed to the output unchanged, but most are mis-corrected. When a pin-line has a cluster of bit errors that is not detected, the internal single-bit error correction flips a bit in that pin-line or in one of the other pin-lines in the 4-pin device to correct a single-bit error parity violation. While DDR5 burst-errors are typically contained within one 16-bit pin-line or within two pin-lines associated with 32-bit bounded fault region, there may also be random bit errors due to noise on a connector-link that is unrelated to the DRAM modules themselves. Since an error-event that was contained in one pin-line can propagate into another pin-line, DDR5 requires powerful outer ECC in the DRAM controller to maintain high system-level reliability.

To minimize the number of symbol errors affected by a single multi-bit error-event, m-bits from the same pin-line are grouped together to form a code symbol in the outer ECC. Note that data bytes and code symbols have the same number of bits but have different orientations. Data bytes are across 8 different pins and code symbols are down a pin-line. Currently, most outer ECC codes for DRAM systems correct only 1 symbol error per codeword due to strict latency requirements that limit how much processing can be accomplished. Given that DRAM channels have dedicated 20% parity overhead for DDR5, there is a pressing need for fast decoding algorithms for more powerful Reed-Solomon codes that can correct more than 1 symbol error per codeword. Stronger Reed-Solomon codes have lower mis-correction rates and provide better protection from device failures and random errors.

Erasure-only RS decoding is fast but requires extremely accurate side-information about the error locations that guarantees that all the errors have been erased. When using a t-symbol error correcting RS code in erasure-only mode, there are two cases: either the received values for the 2t erased symbols are not available, or they are available, and some are likely to be correct. In the first case, erasure-only decoding is used as a second-level of protection specifically for device failure recovery. It is safe to correct all 2t erasures, since the information stored on devices that have not been erased passed a first-level of ECC and is known to be error-free. In the second case, not all errors are predictable and there is always the chance that there will be errors outside the erasure zone that cannot be corrected without using a combination of error and erasure decoding. If there are fewer than t corrections in the erasure zone, then erasure-only decoding can self-verify that the side-information was sufficiently accurate to assume that there are no errors outside of the erasure zone. Relying on erasure-only decoding to correct t or more symbol errors is risky.

Applications that are not latency-sensitive may use error and erasure decoding to correct more than t errors when some errors are erased, but they have no way to self-check and the probability of mis-correction increases with the number of corrections. The present embodiments address this fundamental problem and utilize a list decoding method that safely corrects more than t errors by self-checking for the presence of a viable second codeword on the list.

Latency-sensitive decoding methods in the prior art typically use 1-symbol correcting RS codes over $GF(2^8)$ that are T-way interleaved. If one device fails, each RS code corrects 1 symbol and collectively they reconstruct the T symbols from one failed device, assuming no other random errors occurred. The individual RS codes can detect a decoding error if two or more symbol errors are detected. Since detecting all possible two symbol error patterns is not possible, the RS decoders are usually designed to guarantee that a second symbol error with a small number of bit-errors is detectable. If any one of the codewords has a decoding error, the entire 64-byte data block is flagged as having a detected decoding error. While it is possible to correct symbol errors in T different devices, post-processing is usually applied to check if the combined error-location pattern has errors in more than two devices. If so, a detected decoding error is flagged, since having errors in more than two devices is highly unlikely.

Another option is to use a single T-error correcting code with codeword length n=sT that has sufficient error-correction capability to correct all the symbols written to one failed device out of s devices. Both approaches have 2T symbols of parity and are capable of correcting T symbol errors associated with one device failure. The single t=T codeword option corrects any T symbol errors out of sT symbols $$\binom{sT}{T}$$

ways but requires high-latency decoding. The multiple t=1 codeword option uses low-latency decoding only corrects T symbol errors $$\binom{s}{1}^T = s^T$$

ways. The low-latency approach significantly restricts the number of correctable error patterns. The main problem is that the multiple codeword approach has mis-corrections when there are only two symbol errors, whereas the single codeword approach requires at least T+1 symbol errors to have a mis-correction. Obviously, the one codeword approach offers a more efficient use of the overhead associated with 2T parity symbols. However, the complexity associated with correcting T errors in one codeword is typically managed by using iterative decoding algorithms that require hundreds of clock cycles to complete which is not acceptable for CXL/DRAM controller latency. In terms of ECC efficiency, there is much room for improvement in the area of low-latency decoding algorithms since most of the coding power is wasted on correcting too few errors in too many devices.

In present embodiments, a single ECC code is decoded using a low latency list decoding algorithm that places device-oriented restrictions on the number of ways T or more symbol errors are correctable. The list of correctable error patterns is matched to their probability of occurrence. The list contains error patterns that correct more errors concentrated in a small number of devices. By maintaining a one codeword approach and applying list decoding, the full power of 2T parity symbols is applied to correcting more than T errors while safeguarding against mis-correction. The present embodiments accordingly provide a low-latency burst-error correction algorithm that has correctable error patterns matched to device-oriented burst-errors in a multi-device system.

As noted, present embodiments address the need for a multi-device channel to correct all the symbols in a failed device and still have correction capability left-over to correct or at least detect a random error-event in a second device. Generally, multi-device channels have burst-errors that are device-limited and errors in different devices are considered independent burst-error events. In high-performance channels, the parity information is stored in parallel on dedicated parity devices to facilitate ECC decoding with super low latency. A list decoding algorithm for correcting multiple burst-errors in a multi-device channel is presented and methods for low-latency decoding are provided. In certain embodiments, the list decoder for a t-error correcting Reed-Solomon (RS) code uses a bank of erasure decoders that calculate codewords for all possible combinations of two device-limited burst-errors.

Each codeword on the list of correctable device-combinations is calculated by erasing a combination of 2t received symbols. The number of corrections required to get from the received symbols to the codeword represents the codeword distance. In one embodiment, the codewords with the minimum and second minimum distance are selected. If the two codewords have burst-error patterns with t or more symbol errors and similar a-priori probability, a detected decoding error is flagged to avoid silent mis-correction of the codeword with the minimum distance when there is an elevated risk that the second codeword is the correct codeword. When using ECC with codewords that are separated by at least 2t+1 symbols, the list contains at most one codeword with t or fewer corrections. If the minimum distance codeword has fewer than t corrections or t corrections all in one device, then it is corrected. Otherwise, the minimum distance codeword has t or more corrections in two devices and is corrected only if a detected decoding error is not flagged. In one approach, a safe decision is to flag a decoding error when the presence of a viable second codeword with a likely error-pattern is detected and when the error-pattern associated with the minimum distance codeword is only a marginally better choice. Since the ability to flag a detected decoding error provides an extra layer of protection when correcting two burst-errors with t or more errors, the list decoding algorithm is capable of correcting a number of device-limited burst-errors with more than t symbol errors.

For high-performance DDR5 memory applications, a data block of 64 bytes is striped across 8 DDR5 devices so that each device stores T=8 bytes of data. To protect the data, there are 2 dedicated parity devices that store 2T bytes of parity. Using a RS (n=k+2t,k=64) code over $GF(2^8)$ with t=T can correct t symbol errors and recover a failed device. A standard RS decoder can easily correct two burst-errors in any two devices, provided there are no more than t errors. Note that while standard RS decoders correct errors in up to t different devices, a post-processing step is often applied to flag decoding errors when 3 or more devices are corrected, since errors in more than 2 devices are highly unlikely. There are a variety of standard RS decoding algorithms in the prior art that can correct 8 symbol errors, but all are known to require decoding latencies well beyond the acceptable limits for memory applications.

The present approach solves this problem by providing a low-latency RS list decoding solution that corrects two burst-errors in two devices. There is a limit to the number of symbol errors that can be burst-corrected. For t=8 with symbols over $GF(2^8)$, the upper limit is 12 which is 50% larger than t. For DDR5 DRAM, low-latency RS list decoding corrects 12 symbol errors in two devices which covers one failed device and a random burst-error in a second device. No existing ECC methods in the prior art can provide this level of coverage for DDR5. Without two-device burst-error coverage, DDR5 requires significant server downtime for DRAM maintenance to predict and avoid device failure. With two-device burst-error coverage, the DDR5 memory sub-system can track actual device failures and schedule maintenance at convenient times to avoid a second device failure.

FIG. 1 illustrates the architecture of a self-managed DRAM module 16 that contains a controller chip 20 and multiple DDR devices 24. All the DDR devices 24 are organized into DDR channels 22 that connect s 4-pin DDR devices using a high-speed 4s-bit wide channel interface. As illustrated in FIG. 1, the controller chip 20 contains (i) a CXL/PCIe I/O engine 26 to communicate with the host CPU, (ii) a DRAM controller for each channel 30, and (iii) a management engine 28 that is responsible for the RAS (reliability, availability, and serviceability) of the entire DRAM module 16. Controller chip 20 may for example comprise an application specific integrated circuit (ASIC) device.

Figure 2:
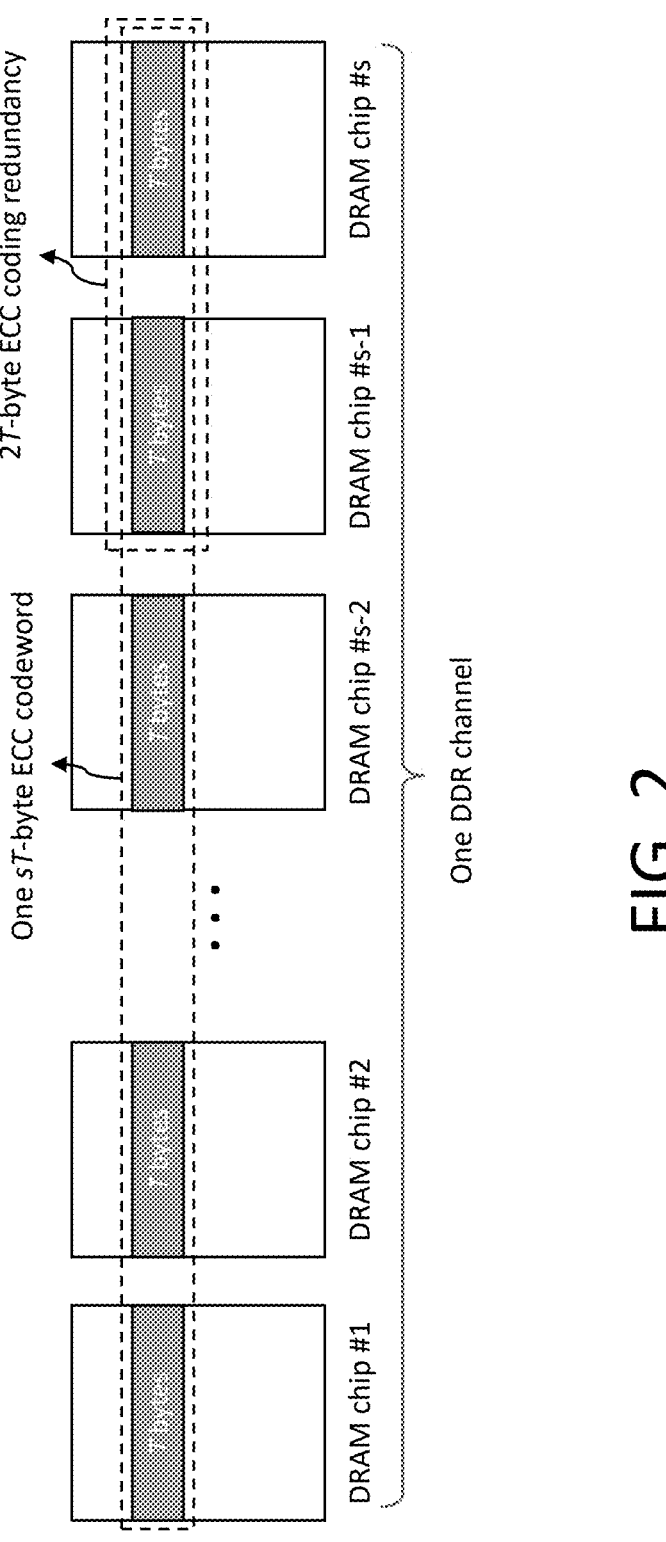
FIG. 2 illustrates one ECC codeword stored across all the s DRAM devices on one DDR channel.

To ensure memory module reliability, the management engine 28 protects data by calculating ECC parity and storing it along with the data. The ECC coding redundancy covers all DDR devices on each channel to tolerate a catastrophic failure of one device, an example of which is shown in FIG. 2. Accordingly, among the s DDR devices in a channel, s−2 devices store user data and 2 devices store ECC parity. The CPU accesses the self-managed DRAM module 16 in units of 64 byte data blocks. When using a single RS (n=k+2t, k) code over $GF(2^8)$ to encode the entire data block, there are k=64 data symbols per block and 2t parity symbols per block with t symbols stored in each DDR device, t=8 symbols per DDR5 device and t=4 symbols per DDR4 device.

As illustrated in FIG. 2, the ECC codeword length is n=s·t symbols, and each ECC codeword is stored across all s DRAM chips on one DDR channel, where each DRAM chip stores t symbols. Data bytes and code symbols have the same number of bits but have different orientations. Data bytes are oriented across 8 different pins, whereas code symbols are all from one pin-line. In one illustrative embodiment, 64 symbols of data are encoded with 16 redundant parity symbols using a Reed-Solomon ECC to create an 80 symbol codeword.

I. RS LIST DECODING

The present list decoder for RS (n=k+2t=sT, k) corrects b device-limited burst-errors in s device-oriented code segments. A codeword is divided into s non-overlapping code segments. Each code segment is associated with a device that may have a burst-error affecting some or all T=ns=2t/b symbols stored in the code segment. Each code symbol is an m-bit wide element of Galois field GF($2^m$) and the maximum codeword length is limited by n<$2^m$. The most-likely burst-errors should be independent and contained within one T symbol code segment. The least-likely correctable burst-errors can straddle up to b code segments.

To correct errors in b out of s code segments, the list decoder uses a bank of $$\binom{s}{b}$$

erasure decoders for optimal coverage. Each erasure decoder erases 2t received symbols associated with one combination of b out of s code segments and uses a specific set of matrix operations over GF($2^m$) to calculate 2t error symbols. Since Reed-Solomon codes are Maximum Distance Separable (MDS) any k=n−2t out of n symbols in the codeword can be used to reconstruct a missing set of 2t code symbols. Given that there are e symbol errors in b devices, the erasure decoder that erases all the errors perfectly reconstructs the 2t erased code symbols and generates e non-zero error symbols representing the difference between the code symbols and the received symbols over the erased code segments. An erasure decoder that does not erase all the errors generates 2t code symbols for an incorrect codeword that is at least 2t+/symbols away from the correct codeword. Given that there are e errors, an incorrect codeword has c non-zero error symbols that require correction with $$2t \geq c \geq 2t + 1 - e.$$

The number of symbol corrections c represents the distance of the incorrect codeword from the n received symbols.

The RS list decoding algorithm finds the codeword for an erased-device combination requiring the fewest symbol corrections. The presence of two likely codewords on the list indicates a heightened risk of mis-correction. When correcting t or more symbol errors, a detected decoding error is flagged if there is a viable second best codeword on the list with a similar number of corrections and an error-pattern with similar a-priori probability. For multi-device channels with device-limited burst-errors, list decoding safely allows for correction of t or more symbol errors in b devices. List decoding harnesses the error correction power of error/erasure decoding without using any side-information or knowledge of real-time device reliability.

The present approach accordingly provides burst error-correction that maximizes the number of errors corrected in a limited number of correctable device-oriented burst configurations. A safe method for correcting more than t symbol errors using a t symbol error correcting RS code is presented. If the correct codeword is on the list, then mis-correction is almost entirely avoided by checking a comprehensive list of all likely error patterns for the presence of a second codeword likely enough to warrant the declaration of a decoding error. When a rare uncorrectable error pattern occurs, the list decoder depends on the strength of the code to detect an uncorrectable error pattern. This approach sacrifices some random symbol error coverage to provide fast decoding with optimal burst-error coverage for a small number of burst-errors.

Much of the decoding complexity depends on the length of the list which is based on the number of correctable device-burst combinations. A combination of b code segments may be permanently pruned from the list to reduce complexity. Permanently removing a particular combination of b code segments from the list means that any error pattern that has errors in all b code segments is uncorrectable. Instead of removing a particular combination, the number of correctable error-location patterns associated with a particular combination of b code segments may be dynamically reduced by assigning the codeword a codeword metric in the uncorrectable range. For instance, in an illustrative embodiment, it is very unlikely to have two failing code segments with more than ½ the symbols in the code segment in error. If most of the symbols in one code segment need correction, only a few symbol errors are expected in the other code segment. In addition, if there is error propagation that increases the number of symbol errors by 1 in that second code segment, then that one extra symbol error will have only 1-bit in error. So, when there is a failing code segment, it may be reasonable to expect that the number of bit errors in the second code segment will be relatively small. For DDR5 with 8 symbols per device, there are $$\binom{8}{4} = 70$$

possible error-patterns associated with correcting 4 symbols in 8 locations. The number of correctable error-patterns can be reduced to $$\binom{4}{2} = 6$$

by requiring that all the symbol errors are associated with 2 of 4 pin-lines.

FIG. 3 depicts a flow chart of an illustrative DRAM error correction scheme. Initially at S1, a system is provided (i.e., designed and implemented) to store a list of correctable code-segment combinations to correct errors in b out of s code segments. If there are T symbol errors in a code segment, then an RS (n=k+2t, k) code with t=b (T/2) can correct errors in b code segments out of s=n/T code segments using a list with $$\binom{s}{b}$$

codewords. Note that in certain embodiments, if the list is too large, then some combinations of errors in b devices may be considered uncorrectable by permanently removing those combinations from the list.

Figure 4:
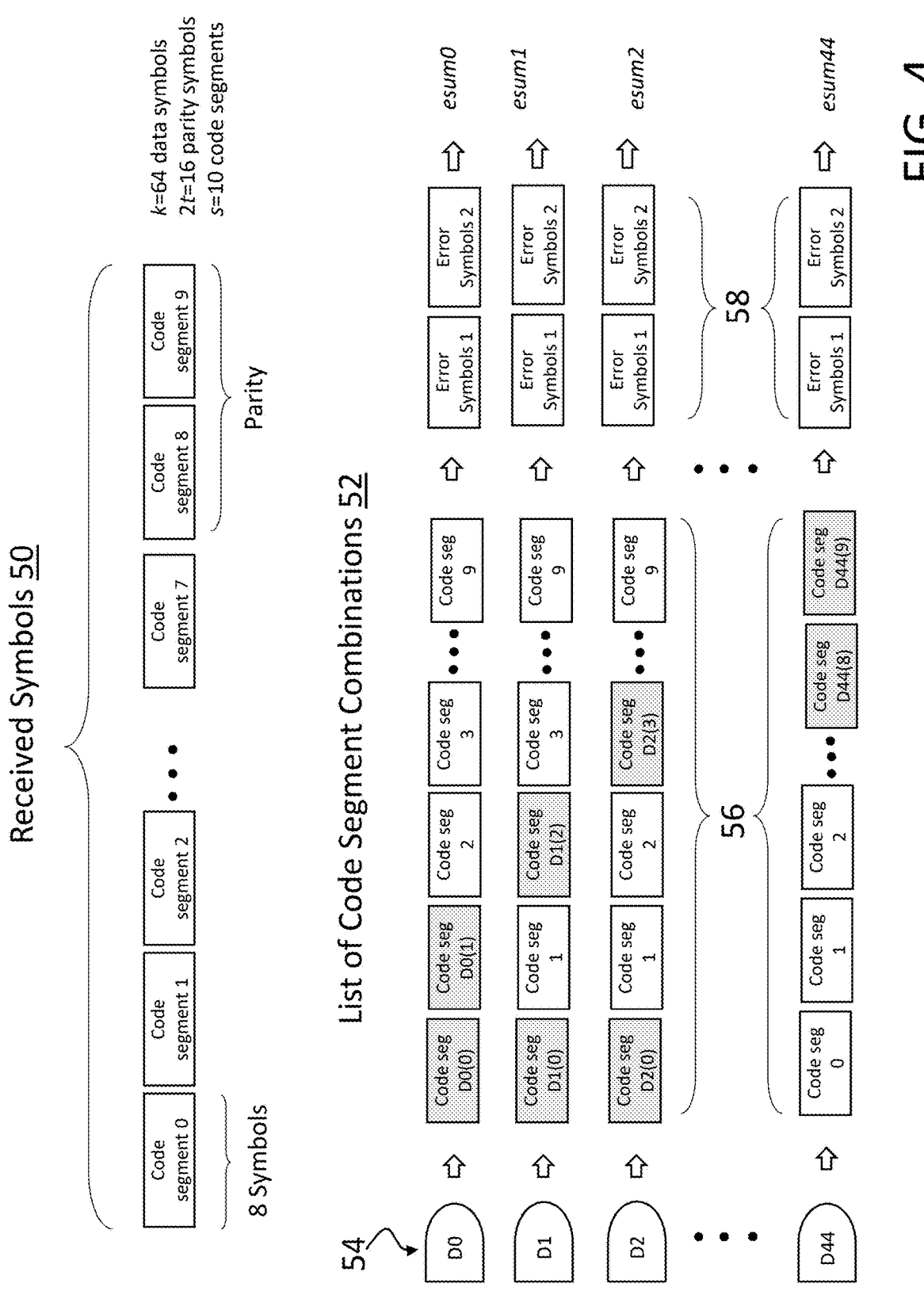
FIG. 4 depicts a set of received symbols and associated list of code segment combinations according to aspects of the disclosure.

FIG. 4 depicts an illustrative example of a list having 45 code-segment combination configured for correcting errors in 2 out of 10 code segments. As shown, each combination in the list 52 has two unique segments highlighted for processing.

Referring again to FIG. 3, the decoding process begins at S2 when a block of code symbols is received. At S3, for each combination on the list, 2t symbols associated with b code segments from the received block are erased and 2t replacement code symbols are calculated to form a valid codeword. There is exactly one codeword associated with erasing 2t received symbols in a specific set of b code segments and replacing them with 2t newly calculated code symbols to form a valid codeword. Given the block of symbols and the list of correctable code-segment combinations, a valid codeword for each combination is calculated.

In the example shown in FIG. 4, a block of 64 data symbols 50 are received for processing, which are broken into 10 code segments. The block of 64 data symbols 50 are then loaded into 45 different memory locations 56, and each location is processed by as respective decoder 54 to provide a different code segment combination. In the example shown in FIG. 4, the first combination in the list 52 has code segments 0 and 1 erased and replaced with code segments D0(0) and D0(1), respectively, the second combination has code segments 0 and 2 erased and replaced with code segments D0(0) and D0(2), respectively, and so on. Accordingly, each memory location 56 has 16 symbols erased and 16 new symbols calculated to form 45 valid codewords. In this case, the erasing and replacement operations are performed by a set of 45 hardware decoders (D0 . . . D44), one for each combination.

Returning again to FIG. 3, at S4, for each valid codeword, calculate 2t error values corresponding to the difference between the calculated symbols and the received symbols for each processed code segment (i.e., the erased zone). The error-symbol locations value may for example comprise a string of 2t bits (01100 . . . ), wherein 1 indicates a symbol error. In one embodiment, if no symbol errors are detected at this step, the block of received symbols is a valid codeword assumed to be the correct codeword. Alternatively, if there are symbol errors, then the process proceeds to S4. As shown in the example of FIG. 4, each memory location 56 has an associated error-location value 58 (each containing a 16-bit value).

Next, at S5, for each valid codeword, calculate the number of corrections and classify the calculated error-locations as correctable or uncorrectable to determine a codeword metric. The number of non-zero bits in the error-location value indicates the number of required corrections, in other words the distance of the valid codeword from the received symbols. The number of corrections in the erased zone is referred to as the erased sum, esum. For example, esum is three for the calculated error-location value of 0001000000010001. If all the errors are erased, then the erased sum is equal to the number of errors.

In some embodiments, esum can be used directly as the codeword metric. In additional embodiments, this step can be extended by determining a probability of whether a calculated error-location pattern is correctable or uncorrectable, and altering the codeword metric based on this likelihood. For example, when the number of corrections in one code segment is large, the codeword metric can be based on the likelihood of the calculated error-location pattern and not just the number of corrections. For instance, in the case of DDR5, it is expected that errors cluster on the 32-bit locations associated with 2 out of 4 pins. DDR5 error-patterns with 3 or 4 symbol errors on 3 or 4 pins are not as likely as 3 or 4 symbol errors on 2 pins. Alternatively, if one code segment has errors in most of the symbol locations and a second code segment has errors in close to half of the symbol locations, a low bit-error count in that second code segment may indicate that there was error propagation.

Next, at S6, two codewords on the list are found with the minimum and the second minimum codeword metrics (the two codewords must be unique). If there are errors, there will be at least two unique codewords on the list. There are many combinations that calculate the same correct codeword when there are fewer than b burst-errors. If the minimum esum is greater than t, then it is possible for there to be a tie, i.e., two unique codewords with the same number of corrections. If the number of corrections required for the most-likely codeword is greater than or equal to t and there is a second likely codeword that is close, then the correction of the most-likely codeword can be stopped by flagging a detected decoding error. If it is not a tie, the most-likely codeword is likely to be correct and the second most-likely codeword is likely to cause a false alarm. To safely correct beyond/errors, some detected decoding errors are required to avoid a silent mis-correction when the second most-likely codeword is correct.

Finally, at S7, S8, and S9, the codeword with the minimum codeword metric is corrected if the minimum distance codeword has fewer than t corrections or t corrections all in one device, i.e., t corrections in b/2 code-segments, or the minimum codeword metric is correctable and no viable second codeword metric is detected. Otherwise, a detected decoding error is flagged at S7. Accordingly, if the minimum codeword metric is greater than a maximum correctable value, detect an uncorrectable error and flag a detected decoding error. Otherwise, based on the value of the minimum codeword metric, select a minimum threshold value for the second minimum codeword metric. If the second minimum codeword metric is greater than the selected minimum threshold value, then correct the codeword associated with the minimum codeword metric. Otherwise, detect two viable codewords and flag a detected decoding error.

The trade-off between correction rate, detected error rate, and silent mis-correction rate should be fine-turned to minimize the false alarm rate while maintaining the lowest possible silent mis-correction rate. A second most-likely codeword that stops the most-likely codeword from being corrected should have an a-priori likelihood that is very close to the most-likely codeword. Keeping the ratio of false-alarms to detected mis-corrections (hits) low may require reducing the number of correctable error-patterns associated with viable second best codewords that cause detected decoding errors.

II. RS LIST DECODING EXAMPLES

In this section, correctable burst-device combinations for a t=8 RS code over GF($2^8$) are described in detail. In one case, the codeword is divided into s=5 code segments with each containing T=2t=16 symbols from two neighboring DDR5 devices. Since $$b = \frac{2t}{T} = 1,$$

a list of $$\binom{s}{b} = \binom{5}{1} = 5$$

codewords is used to correct 1-burst error over 16 symbols in one code segment. Most error patterns that have errors in two devices are not correctable, only a small sub-group that has errors in two neighboring DDR5 devices is correctable.

In a second case, the codeword is divided into s=10 code segments with each containing all T=t=8 symbols from one DDR5 device. Since $$b = \frac{2t}{T} = 2,$$

a list with $$\binom{s}{b} = \binom{10}{2} = 45$$

codewords is used to correct errors over 16 symbols in any 2 of 10 devices in a DDR5 channel. In this case, a given code segment is erased in combination with each of the other code segments. If all the errors are contained in one code segment, then there is s−1 combinations that erase all the errors and calculate the same correct codeword. If there are errors in two devices, then there is one combination that corrects the errors.

In a third case, it is reasonable to assume that most DDR5 burst-errors affect the two symbols associated with 1-pin and that the most-likely burst-errors are limited to well-defined 2-pin ½ device boundaries. For instance, pins 0 and 1 are one ½ device and pins 2 and 3 are a second ½ device. In this case, some of the least likely 32-bit bounded faults and the event of a full device failure have errors that straddle two neighboring code segments. A codeword can be divided into s=20 non-overlapping code segments with T=t/2=4 symbols in each code segment. Since $$b = \frac{2t}{T} = 4,$$

a list of $$\binom{s}{b} = \binom{20}{4} = 4845$$

codewords is used to correct errors over 16 symbols in 4 different code segments. The complexity is reduced by correcting at most 3 independent burst-errors by removing the least likely combinations with errors in 4 different devices. A list of $$\binom{10}{2} + 4 \cdot 10 \sum_{i=0}^{10-2} i = 1485$$

codewords is used to correct up to 3 burst-errors in 3 devices: 1 full device and any combination of 2 other ½ devices.

In this section, a t=4 RS code over GF($2^8$) is used to correct different device-burst configurations for DDR4, or for low-cost DDR5 where one of the parity devices and ½ the parity information is removed from the channel to reduce cost. Since there are 8 parity symbols rather than 16, it is no longer possible to correct all 8 symbols in a failed DDR5 device, without knowing which device failed. In one case, the codeword is divided into s=9 code segments with each containing T=2t=8 symbols from neighboring DDR4 devices or 1 DDR5 device. Since $$b = \frac{2t}{T} = 1,$$

a list of 9 codewords is used to correct errors over 8 symbols in one code segment. In a second case, which is preferred, the codeword is divided into s=18 code segments with each code segment containing all T=t−4 symbols errors from one DDR4 device or ½ a DDR5 device. Since $$b = \frac{2t}{T} = 2,$$

a list containing 153 codewords is used to correct errors over 8 symbols in any 2 of 18 code segments (i.e, devices in a DDR4 channel). When making 4 corrections, it is possible that there is a second codeword on the list with 5 corrections, since the minimum distance between codewords is 2t+1=9. If there are less than 4 symbol corrections or the 4 symbol corrections are in one code segment, then correct the minimum metric codeword. Otherwise, if the minimum metric codeword has 4 or 5 symbols errors, then correct the minimum metric codeword if there is no viable second codeword with similar a-priori probability to force a detected decoding error.

Next consider a hybrid case where a low-cost DDR5 rank configuration with 9 devices per channel uses the same t=8 RS code as a regular DDR5 channel with 10 devices by erasing the 8 symbols associated with the missing parity device. The codewords are divided into s=10 code segments, with each code segment containing T=t=8 symbols in one DDR5 device. During encoding, the same codeword is used for both DDR5 and low-cost DDR5, except that the 8 symbols for the second parity device are dropped since there is no last device attached to the channel interface. The regular list decoding algorithm that corrects 2 code segments using a list of 45 combinations of 2 out of 10 code segments is repurposed to correct 8 erasures in a known last code segment and errors over 8 symbols in another code segment.

When operating in low-cost DDR5 mode, the list is pruned from 45 down to 9 combinations that include the erased last device and one other device. In addition, different rules for declaring decoding errors are applied. If there are less than 4 symbol corrections or the 4 symbol corrections are on 2-pins, then correct the minimum metric codeword. Otherwise, if the minimum metric codeword has 4 or 5 symbols errors, then correct the minimum metric codeword if there is no viable second codeword with similar pin error count to force a detected decoding error.

III. LIST DECODING ALGORITHM VARIATIONS

An aspect of the present invention is that the reliability of individual devices can be unknown to the decoding algorithm. Every codeword on the list can be treated as equally likely. The list decoding algorithm is able to deduce on its own which codeword is most likely based on codeword metrics. It is theoretically possible to use real-time side-information that evolves with the health of the multi-device system in the codeword metric process. Best case, 2t code symbols can be corrected with side-information that perfectly identifies up to b unreliable code segments and there happen to be no random errors in code segments that are not identified. However, if the side-information is not reliable enough, then it will hurt rather than help since not all errors are predictable.

There are many possible variations on the basic list decoding algorithm. If there is real-time side-information about a predicted device failure it can be used to change the decision boundaries used in the process of determining whether to flag a detected decoding error. For instance, if the minimum codeword metric is in the uncorrectable range and side-information indicates that one of the erased code segments corrected in the most-likely codeword is known to be unreliable, then the side-information verifies that the most-likely codeword is a good choice. The presence of a second codeword that does not correct errors in the unreliable code segment need not interfere with the correction of this codeword.

It is easy to incorporate side-information by limiting the number of combinations considered to include code segments attributed to a known unreliable device, or by allowing more errors to be corrected when side-information is available. If side-information is able to accurately identify b unreliable devices and no errors occur outside of these devices, then all 2t code symbols associated with the unreliable devices can be corrected.

Low-latency decoding algorithms that efficiently correct a small number of device-limited burst-errors are presented. More powerful RS codes can correct more device-burst combinations. Non-memory applications of RS coding that do not have tight latency requirements may not care about the fast-decoding aspects of this invention. Any application where the parity overhead is limited to 2t symbols and b-bursts with more than t symbol errors occur frequently can benefit from the extra burst-error correction power provided by the present embodiments. When a decoding error is detected, it is possible to follow up with a longer-latency standard RS decoding algorithm that corrects t randomly located symbol errors or to reread the block hoping for a small difference in the random error-pattern.

IV. FURTHER EMBODIMENT

The (n, k) Reed-Solomon code is a k-dimensional subspace of the vector space of all n-tuples over $GF(2^m)$. There are $2^k$ codewords and each codeword is guaranteed to differ from all other codewords in at least 2t+1 symbol locations. The parameter t is referred to as the error-correction capability.

In general, code symbols contain m-bits that are likely to have errors due to a single burst error-event. In the preferred embodiment, the RS code symbols contain m-bits transferred over the same pin over m or 2m beats and all the code symbols that contain bits from the same pin are likely to have bit-errors due to a single burst error-event. For DDR5, there are two 8-bit code symbols per pin and 8 code symbols per 4-pin DDR5 device. For DDR4, there is one 8-bit code symbol per pin and 4 code symbols per 4-pin DDR4 device.

The Reed-Solomon list decoding system for RS (n=k+2t, k) uses a bank of $$\binom{s}{b}$$

erasure decoders for optimal coverage of b burst-errors amongst s code segments. Each code segment is associated with a device that may have a device-limited burst-error affecting some or all T=2t b symbols stored in the code segment. Each erasure decoder erases 2t received symbols associated with a combination of b non-overlapping code-segments. A specific pre-determined set of matrix operations over Galois field $GF(2^m)$ is performed on the n received symbols to calculate 2t error symbols. The number of non-zero error symbols out of 2t is the distance of the received symbols from a codeword with corrections confined to a specific 2t erasure zone associated with b code segments.

Each erasure decoder calculates exactly one codeword that requires 0 to 2t corrections. The erased sum esum is the number of corrections. If the best codeword on the list has 0 corrections, then all the codewords on the list have 0 corrections. This is the no errors case. If there are errors in only one code segment, then all combinations that erase the erroneous code segment decode to the same correct codeword. If there are errors in b code segments, then there is only one codeword on the list that is correct. If there are errors in more than b code segments, then the correct codeword is not on the list.

If the correct codeword is on the list and has too many symbol errors the RS list decoding system cannot distinguish it from an incorrect codeword on the list. There is a limit to the number of errors that can be corrected based on the error-correction capability of the code and the probability that an incorrect codeword falls into the correctable range. Let $E_t$ denote the maximum number of correctable errors based on an acceptable level of detected decoding errors. The value of $E_t$ is the upper-bound on the correctable range.

A codeword metric is determined based on the number of corrections esum and the a-priori probability associated with a calculated error-location pattern. In one embodiment, if there is a codeword with fewer than t corrections or if there is a codeword with t corrections in b/2 code segments then the codeword is corrected. Otherwise, the codeword with the minimum codeword metric is corrected if a detected decoding error is not flagged. A decoding error is flagged if the minimum codeword metric is in the uncorrectable range or if a second viable codeword is detected with the same or similar codeword metric.

DDR5 memory applications are predominantly concerned with one device failure, the probability of an uncharacteristic error pattern with errors in three devices is extremely low. To maintain system-level health, the probability that there is more than one failing device must be small. Elaborate health monitoring and repairing is required to remap devices with a predicted failure. After a device has been identified as having reduced reliability, system downtime is required to complete the renewal process. The disclosed embodiments address this issue and provide a safe way to continue to use a multi-device system even when there is a high probability that there are two devices with a significant number of symbol errors.

To effectively correct beyond t symbol errors, it is important to filter out the least likely ones and focus on correcting the most likely ones. The present embodiments provide a low-latency list decoding method for correcting up to 12 errors in two DDR5 devices with a focus on only correcting one failing device with up to 8 errors and a small random burst-error on a second device with at most 4 symbol errors on 2 pin-lines. Error-patterns with five or more errors in both devices are uncorrectable and error-patterns with 11 to 12 errors that have 3 or 4 errors on more than 2 pin-lines in a second device are uncorrectable.

Figure 5:
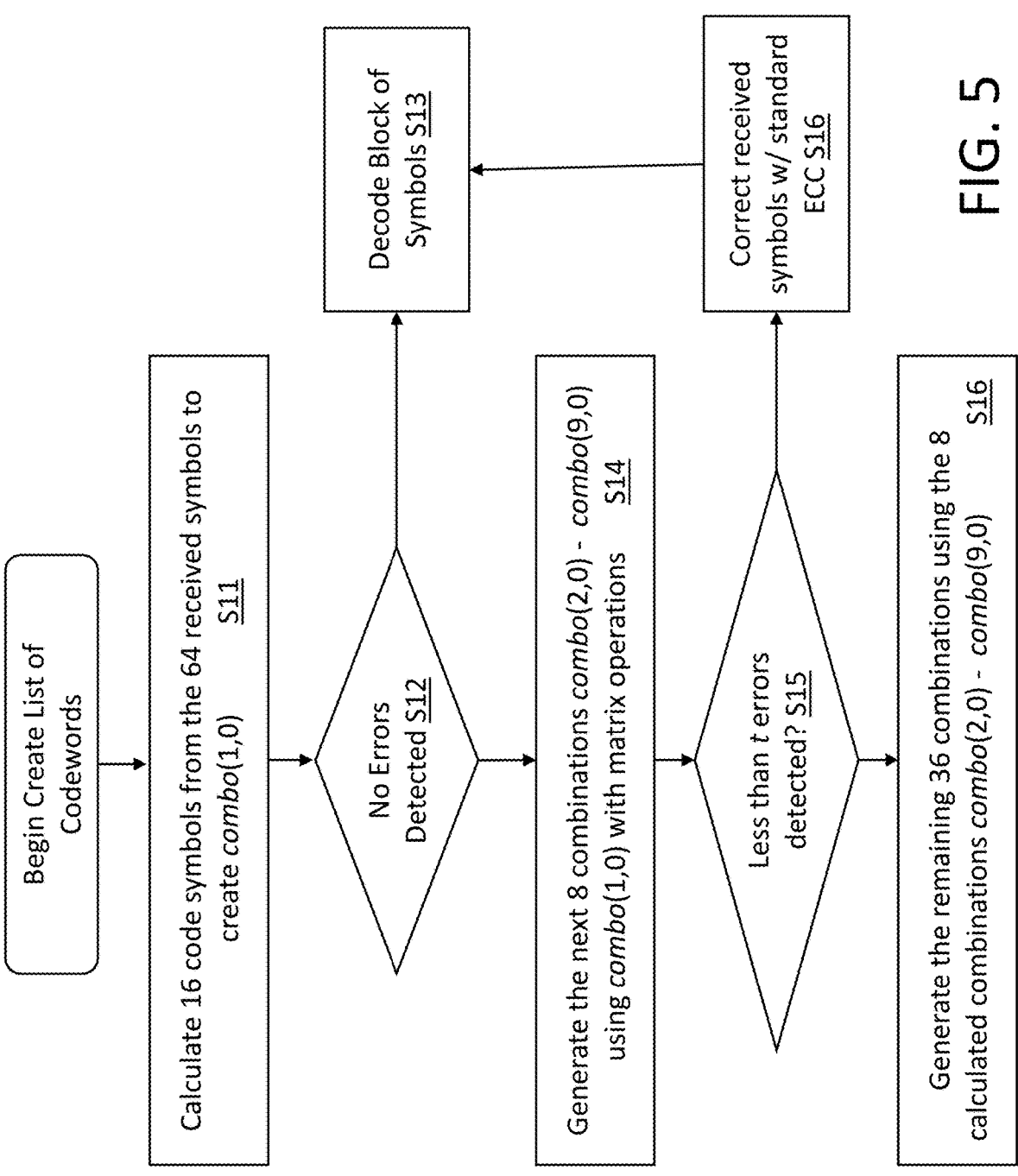
FIG. 5 illustrates the process of calculating 45 codewords according to aspects of the disclosure.

An intensive step in the decoding process involves calculating codewords for all the code-segment combinations on the list. In various embodiments, this process can be done over stages to reduce complexity. For example, in the embodiment shown in FIG. 4, the number of multiplications in GF($2^8$) can be reduced by streamlining the process over three stages. FIG. 5 depicts such a process for generating the list of valid codewords. The first stage, at S11, calculates the first codeword based on 64 out of 80 received symbols 50, which includes calculating 16 replacement code symbols. In this case, the first list position (l=0) erases code segments 0 and 1 and is represented as combo (1,0). This first codeword calculation is similar in size and complexity to an RS encoder that takes in 64 data symbols and calculates 16 parity symbols. There is only one additional step that involves calculating the 16 error symbols 58 for combo (1,0) by modulo2 addition of the 16 calculated code symbols and 16 received symbols.

In this embodiment, once the first codeword is calculated and the error symbols are calculated, a determination can be made whether there are any detected errors at S12. If there are no detected errors, the received symbols 50 form a valid codeword, and the data can be written without correction at S13. If not, the process continues to the second stage at S14.

At the second stage, S14, the 16 error symbols from combo (1,0) are used to generate the 16 error symbols for the next eight combinations on the list with matrix operations, i.e., list positions l=x, combo (1+x, 0) for x=1, 2, . . . 8. Since both the input and output combinations include code segment 0, the matrix operations include diagonalized columns in the transformation matrix that have only one non-zero element. Almost half of the multiplications involve the 0 element in GF($2^8$) and disappear in a hard-coded hardware implementation.

In one illustrative embodiment, a determination can then be made at S15 to determine if less than t errors are detected. If less than t errors are detected, then the received symbols can be corrected with standard ECC at S16 and the data can be written at S13. If not, the process proceeds to the third stage.

The third stage at S16 generates the remaining 36 combinations using the 16 error symbols for each of eight calculated combinations. The 16 error symbols for l=x, combo (1+x, 0) for x=1, 2, . . . 8, are used to calculate the 16 error symbols for list position $$l = 8 + y + \frac{x(x-1)}{2}$$

corresponding to combo (1+x, y) for y=1, . . . , x. Since both the input and output combinations include code segment 1+x, the matrix operations include diagonalized columns in the transformation that have only one non-zero entry. Almost half of the multiplications involve the 0 element in GF($2^8$) and disappear in a hard-coded hardware implementation.

The technique used to calculate the codewords is based on the Chinese Remainder Theorem. Let $$i(X) = \sum_{j=0}^{k-1} i_j X^j$$

represent an information polynomial with coefficients equal to the k data symbols for the correct codeword $\{i_j\}$. The generator matrix of an RS (n, k) code with symbols in GF($2^m$) in Vandermonde matrix form is $$G = \begin{bmatrix} (\alpha^{k-1})^{n-1} & & \alpha^{k-1}\alpha^0 \\ & \cdots & \\ (\alpha^{k-2})^{n-1} & & \alpha^{k-2}\alpha^0 \\ \vdots & \ddots & \vdots \\ \alpha^{n-1} & \cdots & \alpha^1\ \alpha^0 \end{bmatrix},$$

$$H = \begin{bmatrix} (\alpha^1)^{n-1} & & (\alpha^1)^1(\alpha^1)^0 \\ & \cdots & \\ (\alpha^2)^{n-1} & & (\alpha^2)^1(\alpha^2)^0 \\ \vdots & \ddots & \vdots \\ (\alpha^{2t})^{n-1} & \cdots & (\alpha^{2t})^1\ (\alpha^{2t})^0 \end{bmatrix},$$

where $\alpha$ is a primitive element of GF($2^m$). No linear combination of 2t columns of H The generator polynomial for the RS code has 2t+1 roots that are non-zero elements of GF($2^m$), $$g(X) = \prod_{p=0}^{2t} (X - \alpha^p).$$

The parity matrix

Then, the residue of the information polynomial is given by $$i(X) \bmod (X - \alpha^p) = b_p + g(X)(X - \alpha^p)$$

$$b_p = i(X) \bmod (X - \alpha^p)|_{X=\alpha^p}$$

$$[\,b_n\ \ b_{n-1}\ \ \cdots\ \ b_0\,][\,i_k\ \ i_{k-1}\ \ \cdots\ \ i_0\,]G.$$

During encoding the parity symbols are formed by multiplying the information vector by the generator matrix,

V. THEORETICAL OVERVIEW

Assuming that the correct codeword is on the list at list position $l_{correct}$, the erased-sum for the correct codeword is equal to the number of errors, esum [$l_{correct}$]=e. The presence of a correct codeword on the list in the correctable range can essentially stop mis-corrections with t or more corrections. When there is only 1 error, all incorrect codewords have esum[l]=2t. When there are e errors, it is possible and likely that some incorrect codewords will have less than the maximum number of corrections, $$2t \geq esum[l_{incorrect}] = c \geq 2t + l - e.$$

There are two ways that an incorrect codeword can have received symbols in its erasure zone that do not require correction (non-corrections). To select the correct codeword, the correct codeword must have more correct symbols (2t–e) in its erasure zone than an incorrect codeword has non-corrections (2t–c=y+ε≤e–1) in its erasure zone.

If the correct codeword and the incorrect codeword have small distance from each other and there is more than 1 error outside of the erasure zone for the incorrect codeword, $\varepsilon_{out}$, then there can be received symbols of type y that have no error and the code symbol values on the two codewords match, $y \leq \varepsilon_{out} - 1$.

The other way requires the erasure zones for the incorrect and correct codewords to share an erroneous device-segment, and for the error value to make the received symbol exactly match the code symbol on the incorrect codeword. There is exactly one error value out of $2^m - 1$ that can cause a type ε error for a particular location in a pair of codewords. Luckily, this type of error is rare, since it requires a correction for the correct codeword but not for the incorrect codeword.

For the most part, the maximum correction limit $E_t$ is set by the probability of type y code symbols which is well-defined by the weight distribution for the RS code. If there is an incorrect codeword with an unusually large number of type y and/or ε errors, then there is a possibility of detectable decoding error or even a silent mis-correction. Since these random events are uncorrelated, the probability of these undesirable outcomes is small.

For RS list decoding, we have developed mathematical formulations to calculate the probability of mis-correction and the probability of detecting a decoding error. The analysis leverages the RS code structure to count the number of possible ways that corrections and errors can interact, and is loosely based on the combinatorial approach developed by I. Sofair at the Naval Surface Warfare Center in Virginia, "Probability of Miscorrection for Reed-Solomon Codes." The RS enumerator $A_w$ counts the number of codewords in the RS code that are w symbol differences away from each other and is approximated by $$A_w = (2^m - 1)a_w \cong \frac{(2^m - 1)^w}{(2^m)^{2t}},$$

with $a_w = \sum_{i=0}^{w-2t-1}(-1)^i\binom{w-1}{i}2^{m(w-2t-1-i)}$ for $w \geq 2t + 1$ and $a_w = $ 0 for $w < 2t + 1$.

The number of codewords that are separated from the correct codeword by the minimum distance w=2t+1 is $A_w=2^m-1$. The total number of different ways e symbol error values can be generated, N(e), is used to calculate the probability of c corrections given e errors, Pr(c|e)=N(c,e)/N(e). Note that N(e) gets very large as e increases, and we know that the probability of e symbols errors at the output of a DDR channel decreases dramatically as e increases. Therefore, these are two totally different things. The only reason why N(e) works to calculate Pr(c|e) is that N(c,e) also gets very large as e increases and the growth falls out to get a probability from 0 to 1.

Based on a combinatorial analysis of the number of possible ways to get an incorrect codeword with c corrections given e errors, the probability that there is a codeword with c corrections given that the correct codeword has e errors Pr(c|e) is $$Pr(c \mid e) = \frac{\binom{2t - c\_min}{2t - c}255^{c-c\_min}}{256^{2t-c\_min}} = \frac{\binom{e - 1 + me}{2t - c}255^{c+e-2t-1+me}}{256^{e-1+me}},$$

where $$1 = \sum_{c=c\_min}^{2t}Pr(c \mid e)$$

$$Pr(c, e) = P(e)Pr(c \mid e) = \frac{\binom{2t}{e}255^e}{256^{2t}}Pr(c \mid e).$$

The probability that there is a codeword with c corrections given that e ranges from 1 to 2t symbol errors is $$Pr(c) = \sum_{e=e\_min}^{2t}Pr(c, e) = \frac{\binom{2t}{c}255^c}{256^{2t}}\left(\frac{255}{256}\right)^{e\_min}.$$

Given that there are e errors, the minimum number of corrections to get to a valid codeword is $$c \geq c\_min = (2t + 1 - e) \geq 1.$$

Similarly, given that there are c corrections, there must be at least e_min errors, $$e \geq e\_min = (2t + 1 - c) \geq 1.$$

To safely correct beyond/with a mis-correction rate smaller than standard RS decoding, set the maximum number of correctable errors $E_t$ so that the mis-correction rate for RS list decoding is similar to the mis-correction rate for standard RS decoding with e=$E_t$ errors, $$Pr(c = E_t - 2 \mid e = E_t) \cong Pr(c = t \mid e = E_t).$$

For t=8, this suggests that setting $E_t$=1+2=10 and using RS list decoding to correct up to 10 symbols errors in two devices has similar mis-correction rate as standard RS decoding that corrects up to 8 symbols errors in any location. Since the mis-correction rate for standard decoding is extremely low, there is room to increase the maximum number of corrections to a higher value and increase the mis-correction and detected decoding error rates accordingly. Making the mis-correction rate small for e in the range t to $E_t$ requires increasing the detected decoding error rate over that same range. In practice, the value for $E_t$ is set by the acceptable mis-correction rate for uncorrectable errors which is approximated by:

$Pr(c=E_t|e=2t+1-E_t)=2^{-(2t-Et)m}$, which is 2e-10 for $E_g$=12, 9e-13 for $E_g$=11, and 3.5e-15 $E_g$=10, when m=8. Given that the mis-correction rate for standard RS decoding is approximately:

$$Pr(c = t \mid e = t + l) = 2^{-8m} = 5e - 20,$$

$E_t=12$ is a practical limit for DDR5 that takes into account that uncorrectable errors are very unlikely to occur and the probability of a mis-correction is still very low.

For m=8 and t=8, the maximum number of correctable errors is $E_8=t+4=12$ which is 50% larger than t. For m=8 and t=4, the maximum number of correctable errors is $E_4=t+1=5$ which is 25% larger than t.

For m=8 and t=2, the RS error-correction power is not sufficient to expect to correct more than $E_2=t=2$ symbol errors. When using RS list decoding with $E_t=t$, the maximum number of errors corrected is the same for RS list decoding and standard RS decoding. RS list decoding has the drawback that only error patterns with t errors in b device-segments are correctable but has the advantage that mis-correction can be completely avoided at e=t+1 since a decoding error can be detected if the best codeword has t corrections and the second best codeword has t+1. Since t=2 is a weak RS code, the benefit of improved mis-correction rate may be very significant.

RS List decoding provides a safe method for correcting t to $E_t$ symbol errors in b code segments when the maximum number of symbol errors corrected is selected to improve the mis-correction rate beyond what is expected for standard RS decoding.

It is understood that aspects of the present disclosure may be implemented in any manner, e.g., as a software/firmware program, an integrated circuit board, a controller card, etc., that includes a processing core, I/O, memory and processing logic. Aspects may be implemented in hardware or software, or a combination thereof. For example, aspects of the processing logic may be implemented using field program-mable gate arrays (FPGAs), application specific integrated circuit (ASIC) devices, and/or other hardware-oriented systems.

Aspects also may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on a host computer, partly on a host computer, on a remote computing device (e.g., a memory card) or entirely on the remote computing device. In the latter scenario, the remote com-puting device may be connected to the host computer through any type of interface or network. In some embodi-ments, electronic circuitry including, for example, program-mable logic circuitry, field-programmable gate arrays (FPGA), or programmable logic arrays (PLA) may execute the computer readable program instructions by utilizing state information of the computer readable program instructions to control electronic circuitry in order to perform aspects of the present disclosure.

Computer readable program instructions may be provided to a processor of a general purpose computer, special pur-pose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer read-able program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block dia-grams of methods, apparatus (systems), and computer pro-gram products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowcharts and block diagrams in the figures illustrate the architecture, functionality, and operation of possible implementations of systems, methods, and computer pro-gram products according to various embodiments of the present disclosure. In this regard, each block in the flowchart or block diagrams may represent a module, segment, or portion of instructions, which comprises one or more executable instructions for implementing the specified logi-cal function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

The foregoing description of various aspects of the pres-ent disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for correcting errors in a self-managed dynamic random access memory (DRAM) device, comprising:

receive a block of code symbols comprising s code segments each with T symbols from a memory channel into a controller chip within the self-managed DRAM device;

in response to a detected error in the block of code symbols, load the block of code symbols into a bank of $$\binom{s}{b}$$

decoders within the controller chip, wherein each decoder includes a separate memory location for storing the block of code symbols, and wherein b is a number of correctable code segments, and wherein each decoder is configured to correct 2t symbols associated with a combination of b code-segments from the block of received code symbols, where t is a number of symbols in each device in a channel of DRAM devices;

for each decoder, erase code symbols associated with b code segments and calculate replacement code symbols to form a valid codeword;

for each valid codeword, determine a codeword metric based on a number of corrections between the replacement code symbols and the erased received symbols;

identify a first and a second valid codeword on the list having a minimum codeword metric and a second minimum codeword metric, respectively; and correct the first valid codeword based on the minimum codeword metric and the second minimum codeword metric.

2. The method of claim 1, wherein the first valid codeword is only corrected if:

there are less than t corrections or t corrections in b/2 code-segments required in the first valid codeword, wherein 2t=bT is a number of symbols in a combination of b code segments and T is a number of symbols in each code segment; or the minimum codeword metric is correctable and no second codeword metric is identified.

3. The method of claim 1, wherein the codeword metric is further determined based on whether error locations within the combination of b code-segments are classified as correctable or uncorrectable.

4. The method of claim 1, wherein each decoder includes a hardware decoder to process an associated correctable code-segment combination.

5. The method of claim 1, wherein the block of code symbols comprises 64 data symbols, the number of segments s is 10 and b is two.

6. The method of claim 5, wherein the list of valid codewords is generated according to a process that includes:

generating a first valid codeword by calculating replacement code symbols for a first and a second segment of the block of code symbols;

generating s−1 valid codewords by calculating replacement code symbols for the first segment and each of a set of remaining segments of the block of code symbols utilizing a set of error symbols from the first valid codeword calculation;

generating a remaining $$\binom{s}{2} - s$$

valid codewords utilizing the error symbols from the first s valid codewords.

7. The method of claim 6, wherein after the first valid codeword is generated, decoding and writing out the block of codes symbols if no errors are detected.

8. The method of claim 7, wherein after the s valid codewords are generated, correcting the block of code symbols with error correction codes (ECC) if t errors or less than t errors are detected in any one code segment.

9. A self-managed dynamic random-access memory (DRAM) device, comprising:

a plurality of DRAM modules arranged in channels; and a controller chip, the controller chip configured to correct errors in the plurality of DRAM modules according to a process that includes:

receiving a block of code symbols comprising s code segments each with T symbols;

loading the block of code symbols into a bank of $$\binom{s}{b}$$

decoders within the controller chip, wherein each decoder includes a separate memory location for storing the block of code symbols, and wherein b is a number of correctable code segments, and wherein each decoder is configured to correct 2t symbols associated with a combination of b code-segments from the block of received code symbols, where t is a number of symbols in each DRAM device in a channel;

for each decoder, erasing code symbols associated with b code segments and calculate replacement code symbols to form a valid codeword;

for each valid codeword, determining a codeword metric based on a number of corrections between the replacement code symbols and the erased received symbols;

identifying a first and a second valid codeword on the list having a minimum codeword metric and a second minimum codeword metric, respectively; and correcting the first valid codeword based on the minimum code word metric and the second minimum codeword metric.

10. The device of claim 9, wherein the first valid codeword is only corrected if:

there are less than t corrections or t corrections in b/2 code-segments, wherein 2t=bT is a number of symbols in a combination of b code segments and T is a number of symbols in each code segment; or the minimum codeword metric is correctable and no second codeword metric is identified.

11. The device of claim 9, wherein the codeword metric is further determined based on whether error locations within the combination of b code-segments are classified as correctable or uncorrectable.

12. The device of claim 9, wherein each decoder includes a hardware decoder to process an associated correctable code-segment combination.

13. The device of claim 9, wherein the block of code symbols comprises 64 data symbols, the number of segments s is 10 and b is two.

14. The device of claim 13, wherein the list of valid codewords is generated according to a process that includes:

generating a first valid codeword by calculating replacement code symbols for a first and a second segment of the block of code symbols;

generating s−1 valid codewords by calculating replacement code symbols for the first segment and each of a set of remaining segments of the block of code symbols utilizing a set of error symbols from the first valid codeword calculation; and generating a remaining $$\binom{s}{2} - s$$

valid codewords utilizing the error symbols from the first s valid codewords.

15. The device of claim 14, wherein after the first valid codeword is generated, decoding and writing out the block of codes symbols if no errors are detected.

16. The device of claim 15, wherein after the s valid codewords are generated, correcting the block of code symbols with error correction codes (ECC) if t errors or less than t are detected in any one code segment.

17. The device of claim 9, wherein the controller chip comprises an application specific integrated circuit (ASIC) device.

* * * * *